United States Patent [19]

Teramachi

[11] 4,215,904
[45] Aug. 5, 1980

[54] LINEAR CROSS ROLLER BEARING

[76] Inventor: Hiroshi Teramachi, 2-34-8 Higashi-Tamagawa, Setagaya-ku, Tokyo, Japan, 158

[21] Appl. No.: 25,908

[22] Filed: Apr. 2, 1979

[30] Foreign Application Priority Data

Apr. 14, 1978 [JP] Japan .......................... 53/048198[U]

[51] Int. Cl.$^2$ ............................................. F16C 29/04
[52] U.S. Cl. .................................... 308/6 R; 308/3 A
[58] Field of Search .............. 308/6 R, 3 A, 3 B, 3 R, 308/3.6, 203, 217

[56] References Cited

U.S. PATENT DOCUMENTS

| 3,815,293 | 6/1974 | Karbowski | 308/6 R |
| 3,897,119 | 7/1975 | McMurtrie | 308/6 R |
| 3,960,413 | 6/1976 | Abbuhl et al. | 308/3 A |

Primary Examiner—Lenard A. Footland
Attorney, Agent, or Firm—George B. Oujevolk

[57] ABSTRACT

A linear cross roller bearing for use as a linear sliding part in tool machines and other industrial machines is disclosed. The roller bearing comprises a roller cage assembled between a pair of guide rails. The roller cage is formed with a plurality of roller pocket openings of a predetermined shape spaced with a longitudinal distance, each of the openings defining two pairs of roller holding pieces of the same shape, one of the roller holding piece pairs being turned in one direction and the other being turned in the opposite direction to form a roller pocket for receiving a roller in an inclined position between the roller holding piece pairs such that rollers received in every other pockets cross at right angles with rollers in the other roller pockets.

4 Claims, 8 Drawing Figures (a)

(b)

(c)

(d)

LINEAR CROSS ROLLER BEARING

BACKGROUND OF THE INVENTION

This invention relates to a linear cross roller bearing including a pair of guide rails, a roller cage assembled between the guide rails and formed with a plurality of longitudinally spaced roller pockets each receiving a precision roller such that rollers received in every other pockets cross at right angle with rollers in the other pockets.

Linear cross roller bearings having a roller cage formed with elliptical roller pockets for receiving rollers have been proposed in which each roller is held in a point-contact fashion by projections formed on each pocket extending into recesses formed in the roller. With such conventional roller bearings, however, roller comming-off and roller inclination often occur during its rotation due to cage abrasion and any reliable rotating motion cannot be attained. Particularly, a great trouble encountered with such conventional roller bearings is that roller comming-off occurring where there is a difference in length between two guide rails and a part of the roller cage is forced out of the guide rails will result in great damage to the machine.

BRIEF SUMMARY OF THE INVENTION

The present invention has for its object to eliminate the above disadvantages found in conventional linear cross roller bearings.

It is a primary object of the present invention to provide an improved linear cross roller bearing which has an increased effective contact length between the rollers and the guide rails for increased load capacity and which provides plane-contact between the roller cage and the roller for positive roller holding capability and anti-skewing property.

Another object of the present invention is to provide an improved linear cross roller bearing which can reduce the distance between the guide rails and increase its dust respiration property.

Still another object of the present invention is to provide an improved linear cross roller bearing in which each roller is held between two pairs of roller holding pieces for improved stability.

DETAILED DESCRIPTION OF THE INVENTION

Figure 1:
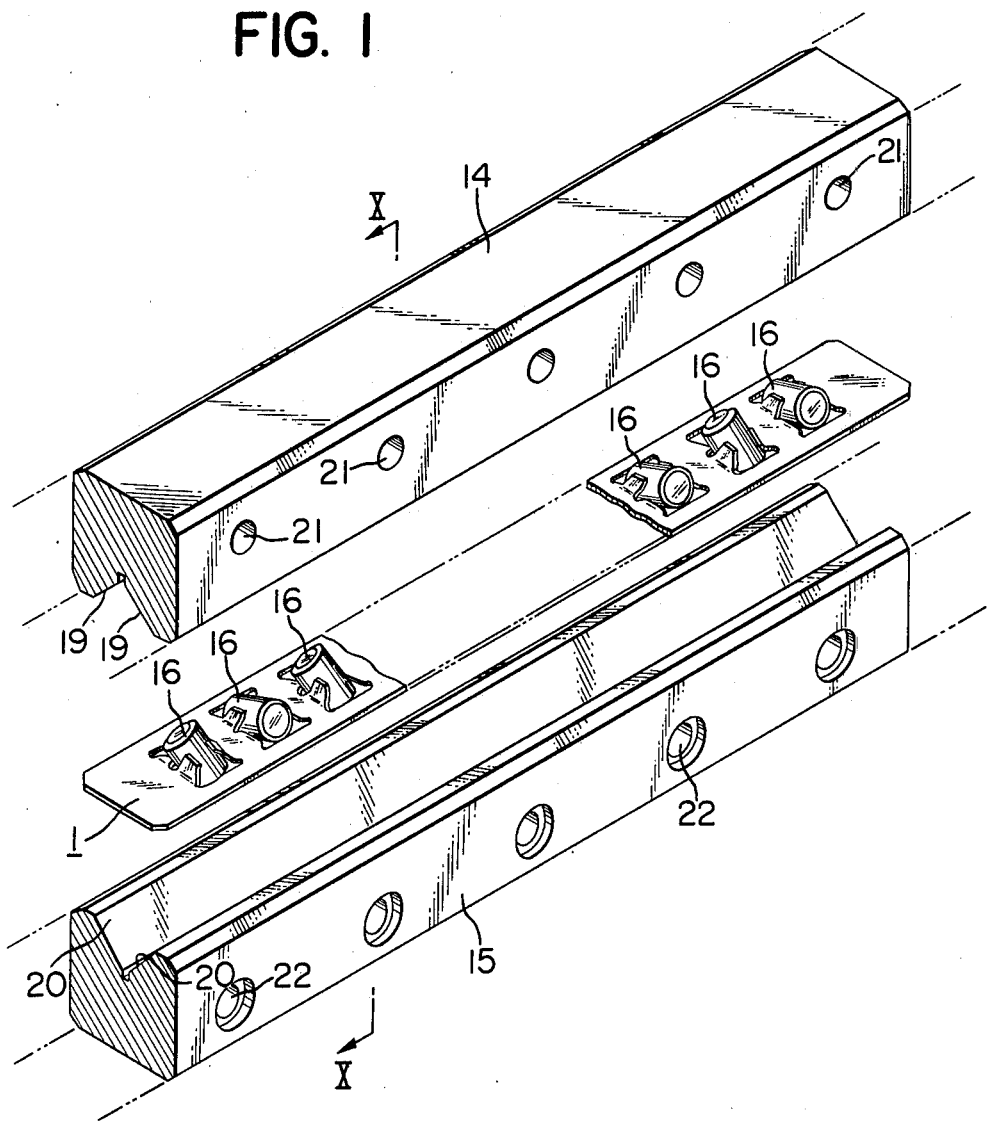
FIG. 1 is an exploded perspective view of a linear cross roller bearing made in accordance with the present invention.
Figure 2:
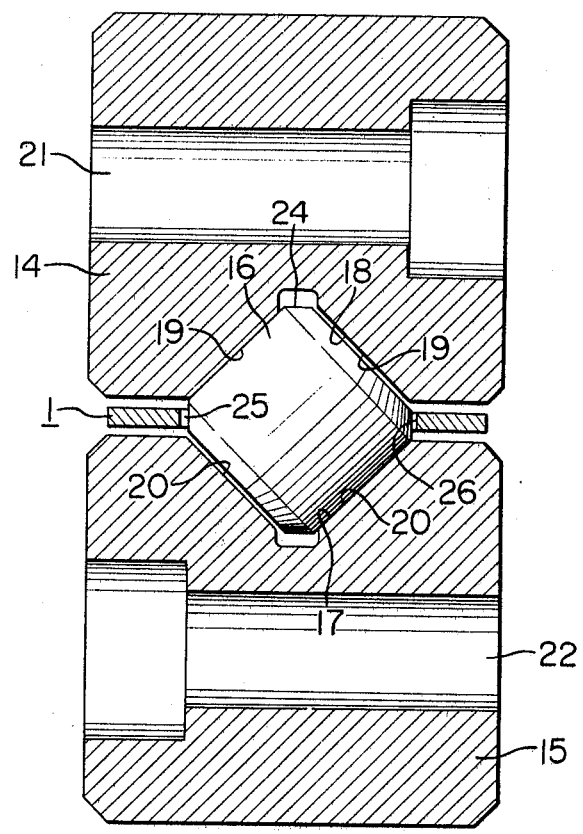
FIG. 2 is a sectional view taken along the line X—X of FIG. 2.

One embodiment of a linear cross roller bearing of the present invention will now be described, by way of example, with reference to the accompanying drawings, in which designated at 1 is an elongated roller cage formed of a material having high resistance to wear such as, for example, heat-treated steel strip. The roller cage 1 is formed therein with a plurality of roller pockets 2 spaced with a longitudinal distance. Each of the roller pockets 2 is formed as follows: The roller cage 1 is punched to have a roller pocket opening made up of symmetrical upper and lower openings substantially of a trimmed hat and a center slit 4 connecting the upper and lower openings as shown in FIG. 3A. The upper opening is defined by an upper slit 3 having a length slightly shorter than that of the center slit 4 extending longitudinally of the roller cage 1 and a pair of inclined lines 6 and 8 extending from the upper slit 3 to the center slit 4 so as to form a pair of roller holding pieces 10 and 11 having substantially the same shape. The lower opening is defined by an lower slit 5 having a length slightly shorter than that of the center slit 4 and a pair of inclined lines 7 and 9 extending from the lower slit 5 to the center slit 4 so as to form a pair of roller holding pieces 12 and 13 having substantially the same shape as that of the roller holding pieces 10 and 11. One of the upper and lower roller holding piece pairs is turned upward and the other is turned downward for formation of a roller pocket 2. The upper roller holding piece pair is turned upward and the lower roller holding piece pair is turned downward in every other roller pockets and the upper roller holding piece pair is turned downward and the lower roller holding piece pair is turned upward in the other roller pockets such that rollers received in every other pockets cross at right angles with rollers in the other roller pockets.

The roller cage 1 carrying thereon a plurality of rollers is assembed between the right-angled V-shaped grooves 17 and 18 of upper and lower or right- and left-hand guide rails 14 and 15. The inclined surfaces 19 and 20 of the V-shaped grooves 17 and 18 of the guide rail 14 and 15 have a width longer than the length of the roller 16. The guide rails 14 and 15 are formed with mounting holes 21 and 22, respectively.

The linear cross roller bearing of the present invention comprising a pair of guide rails and a roller cage formed with roller pockets each provided with two pairs of roller holding pieces 10, 11 and 12, 13 for holding the curved surface of the roller 16 therebetween can more positively hold rollers to eliminate the occurrence of roller comming-off and skewing as compared to conventional linear cross roller bearings in which each roller is held in a point-contact fashion. The effective contact length between rollers and guide rails can be increased for remarkably increasing load capacity. The tapered end positions formed in the roller 16 are in sliding contact with the edges 25 and 26 for smooth roller rotating motions.

FIG. 3B illustrates an advantageous form of the present invention in which the roller pocket opening is made up of a trimmed-hat shaped upper opening defined by an upper slit 3 and convex lines 6' and 8', a trimmed-hat shaped lower opening defined by a lower slit 5 and convex lines 7' and 9', and a center slit 4 connecting the upper and lower openings so as to form upper and lower pairs of roller holding pieces 10', 11', 12' and 13' of the same shape.

Figure 3:
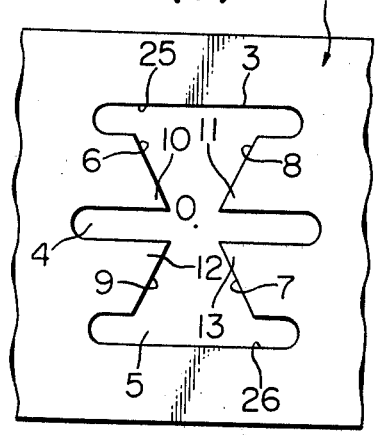
FIG. 3A is a plan view showing an advantageous form of the present invention.
FIGS. 3B to 3D are plan views showing other advantageous forms of the present invention.
Figure 3:
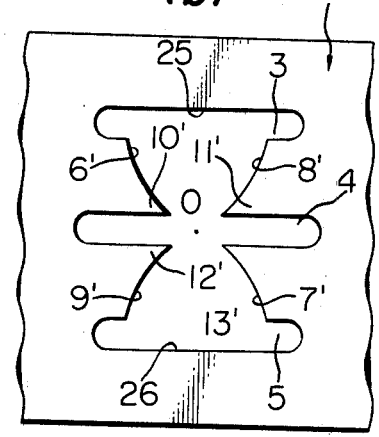
Figure 3:
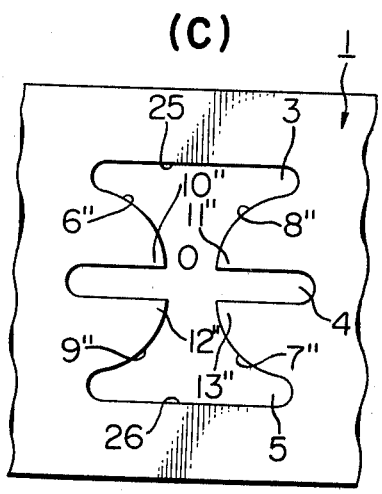
Figure 3:
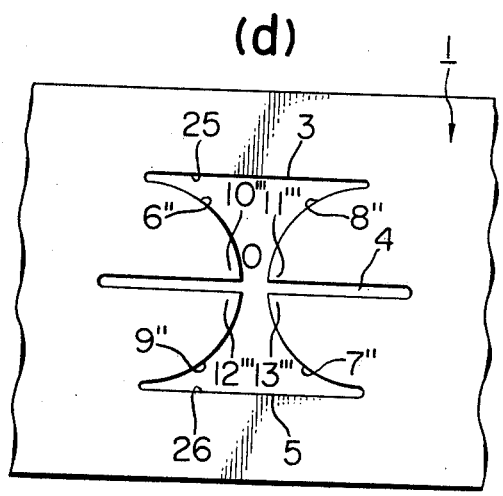
Figure 4:
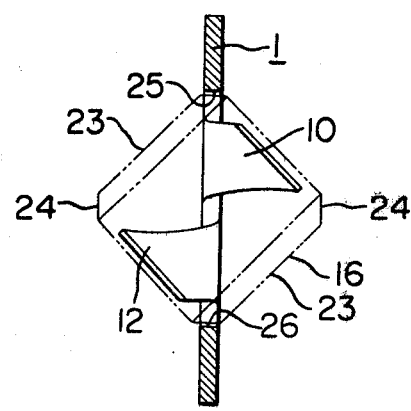
FIG. 4 is a perspective view showing the turned roller holding pieces of the roller cage of FIG. 3A.
Figure 5:
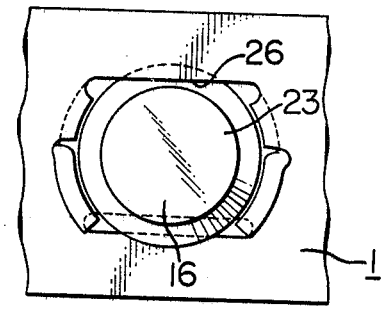
FIG. 5 is a side view showing a roller received in a roller pocket.
Figure 6:
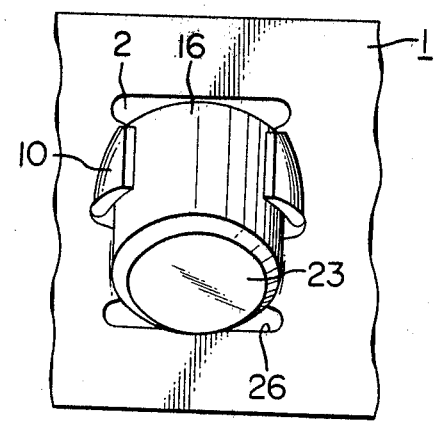
FIG. 6 is a plan view of the roller of FIG. 5.
Figure 7:
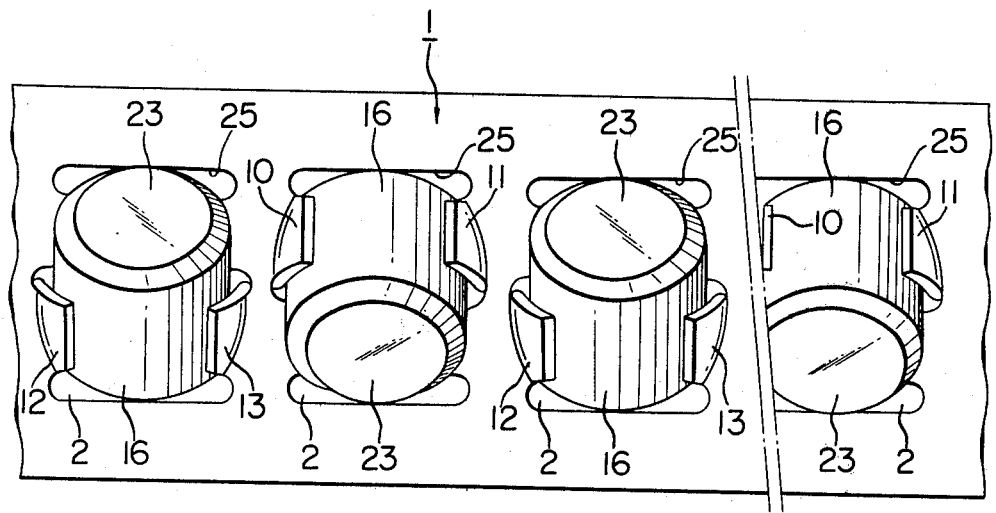
FIG. 7 is a plan view showing a roller received in a roller pocket.
Figure 8:
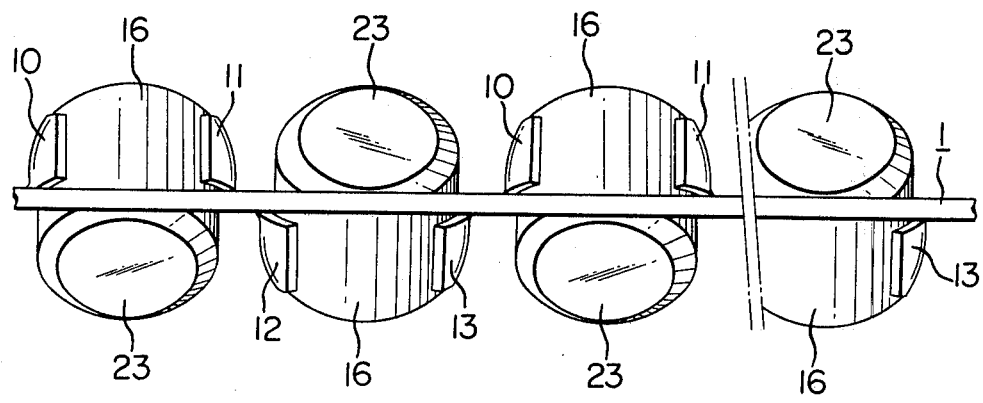
FIG. 8 is a side view of the roller of FIG. 7.

FIG. 3 illustrates another advantageous form of the present invention in which the roller pocket opening is made up of a trimmed-hat shaped upper opening defined by an upper slit 3 and a concave line 6" and 8", a trimmed-hat shaped lower opening defined by a lower slit 5 and concave lines 7" and 9", and a center slit 4 connecting the upper and lower openings so as to form upper and lower pairs of roller holding pieces 10", 11", 12" and 13" of the same shape.

FIG. 3D illustrates still another advantageous form of the present invention which is particularly useful in forming small-sized roller pockets in a small-sized roller cage, i.e., where it is very difficult to simultaneously form roller pocket openings having such a large size as shown in FIGS. 3A to 3C, or where there is no need for such large-sized roller pocket openings as shown in FIGS. 3A to 3C. In this form, the center slit 4 and the upper and lower slits 3 and 5 may be of a size sufficient to form upper and lower pairs of roller holding pieces 6, 7, 8 and 9.

The linear cross roller bearing of the present invention has its rigidity increased twice and its life increased six times and higher in lubrication property and smoother in movement as compared to conventional ones.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A linear cross roller bearing comprising a roller cage provided with a plurality of roller pockets spaced with a longitudinal distance, each of the roller pockets including a roller pocket opening to form two pairs of roller holding pieces of substantially the same shape, one of the roller holding piece pairs being turned in one direction and the other being turned in the opposite direction for holding a roller between the roller holding piece pairs in an inclined position such that rollers received in every other roller pockets cross at right angles with rollers in the other roller pockets.

2. A linear cross roller bearing as set forth in claim 1, in which each of the roller pocket openings is made up of a trimmed-hat shaped upper opening defined by an upper slit and two linear side lines, a trimmed-hat shaped lower opening defined by a lower slit and two linear side lines, and a center slit connecting the upper and lower openings at their heads so as to form upper and lower pairs of roller holding pieces of substantially the same shape.

3. A linear cross roller bearing as set forth in claim 1, in which each of the roller pocket openings is made up of a trimmed-hat shaped upper opening defined by an upper slit and two convex side lines, a trimmed-hat shaped lower opening defined by a lower slit and two convex side lines, and a center slit connecting the upper and lower openings at their heads so as to form upper and lower pairs of roller holding pieces of substantially the same shape.

4. A linear cross roller bearing as set forth in claim 1, in which each of the roller pocket openings is made up of a trimmed-hat shaped upper opening defined by an upper slit and two concave side lines, a trimmed-hat shaped lower opening defined by a lower slit and two concave side lines, and a center slit connecting the upper and lower openings at their heads so as to form upper and lower pairs of roller holding pieces of substantially the same shape.

* * * * *